United States Patent
Tornheim

[15] 3,666,123
[45] May 30, 1972

[54] TAILGATE CARGO LIFTING APPARATUS FOR THE REAR END OF A TRUCK

[72] Inventor: Harold Tornheim, 430 N. Auburn Ave., Sierra Madre, Calif.

[22] Filed: Jan. 20, 1971

[21] Appl. No.: 107,991

[52] U.S. Cl. ....................................................214/77 P
[51] Int. Cl. ..............................................................B60p 1/48
[58] Field of Search ....................214/77 R, 77 P, 75 T, 501

[56] References Cited

UNITED STATES PATENTS

| | | | |
|---|---|---|---|
| 1,630,473 | 5/1927 | Ducondu | 214/77 P |
| 1,916,869 | 7/1933 | Stewart et al. | 214/77 P |
| 2,589,654 | 3/1952 | Archer | 214/77 P |
| 3,243,060 | 3/1966 | Pietroroia | 214/75 T |

Primary Examiner—Gerald M. Forlenza
Assistant Examiner—Robert J. Spar
Attorney—Sellers & Brace

[57] ABSTRACT

Tailgate cargo lifting apparatus for the rear end of a truck capable of handling unusually heavy loads. The apparatus utilizes a power-operated yoke pivoting in a vertical plane and employing linkage and flexible line means to maintain the cargo support platform level while swinging it in an arc between the rear end of the truck and the ground. The cargo platform may be a single rigid structure or formed in major and minor sections hinged together transversely of the truck for compact stowage in an upright position when not in use. The apparatus includes provision for using the power drive to aid in pivoting the platform to its fully retracted position.

20 Claims, 6 Drawing Figures

INVENTOR
HAROLD TORNHEIM
BY
ATTORNEYS

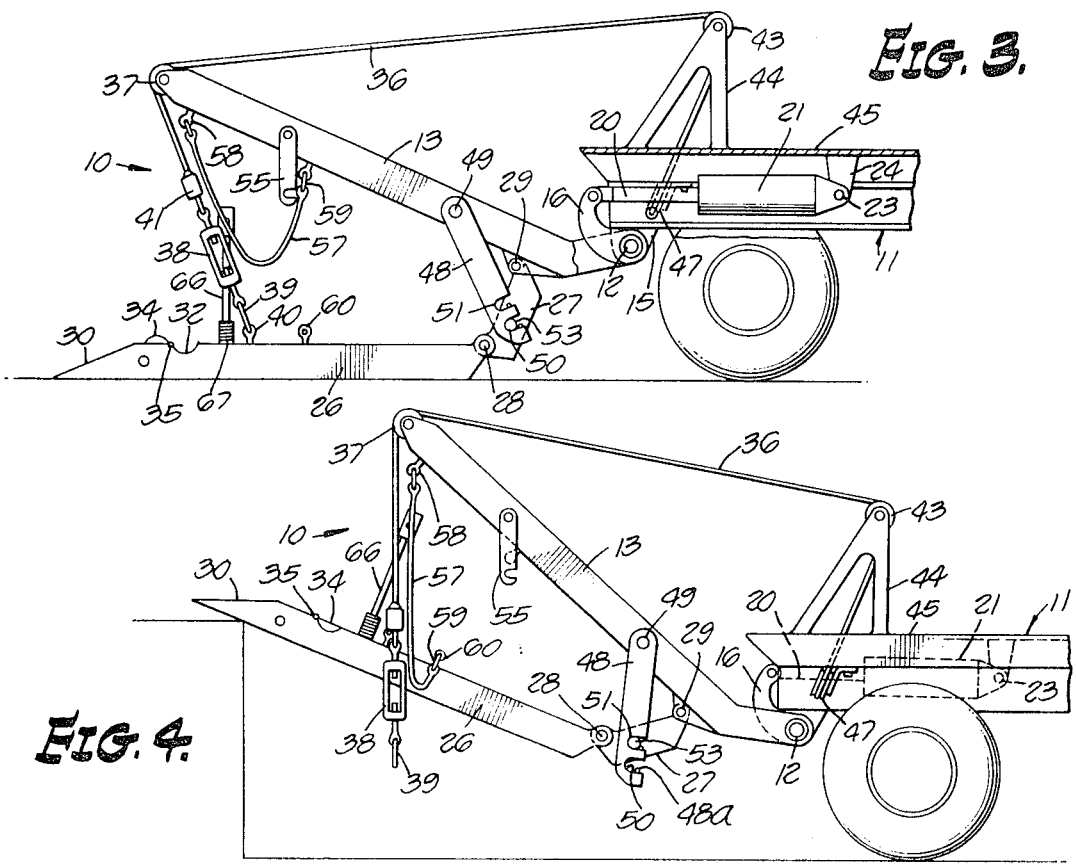
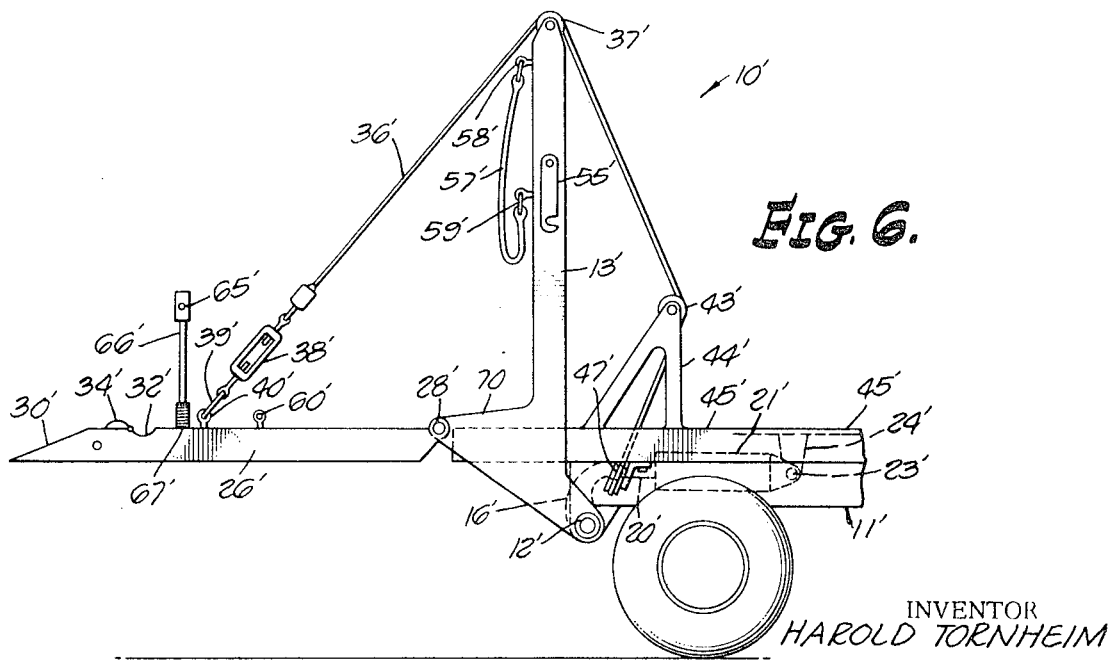

TAILGATE CARGO LIFTING APPARATUS FOR THE REAR END OF A TRUCK

This application is related to and embodies improvements over the cargo lifting apparatus disclosed in my copending application for U. S. Letters Pat. Ser. No. 749,358 filed Aug. 1, 1968, now Pat. No. 3,522,894 issued Aug. 4, 1970.

Various cargo handling devices have been proposed heretofore for shifting cargo between a truck bed and either the ground or a dock. However, these prior constructions are subject to numerous shortcomings and disadvantages sought to be avoided by the present invention. More specifically, prior power-operated lifting devices are so designed that they are inherently limited as respects their load handling capability. In most cases this is due to the fact that the load platform is pivotally connected to the lifting mechanism along its inner edge and depends upon the cantilever strength characteristics of the platform. The expeditious handling of many cargo items today requires the use of forklift trucks often unavailable at the destination of the cargo. It is therefore common practice to utilize a forklift truck capable of being towed behind the hauling vehicle. This practice is costly and subjects the forklift truck to traffic hazards, unnecessary wear and abuse while being hauled over the highway. The forklift cannot be carried by the hauling truck because present-day tailgate lifts are inadequate in size and lifting capacity.

With the foregoing and other shortcomings of prior tailgate lifts in mind, it is the purpose of this invention to provide an improved heavy duty tailgate lift apparatus readily attachable to existing truck chassis and having fully adequate capacity to lift a forklift truck between the ground and the bed of the hauling truck. For this purpose the invention lift comprises a heavy duty yoke having means for journalling its bight portion on the rear end of a truck chassis. The forward end of a large cargo platform is pivoted to the arms of this yoke structure whereas the rear end of the platform is supported by a flexible pair of tension lines having their mid portions trained over pulleys carried at the upper ends of the yoke arms and anchored at their forward ends to the truck chassis. The several parts of this linkage assembly are so related to one another that the pivotal movement of the yoke by the power operating means maintains the load platform continuously substantially level while moving in an arc between ground and truck bed level. Moreover, the four-point support for this level platform assures a strong, fully controlled support for the load and permits use of a lighter weight cargo platform than would be possible if it were supported cantilever fashion as has been customary heretofore.

The cargo platform may be formed in a single rigid section hinged to a rearward extension of the yoke, or alternatively it may be formed in a major and a minor section hinged together and having the forward edge of the minor section hinged to the yoke. Pivotal movement of the minor section may be avoided by use of a readily detachable pair of braces. When the two-section platform is not being used to carry loads the brace is disconnected, allowing the two sections to fold compactly against one another in an upright travel position.

Another feature of the invention is the use of the power means for the lift to swing the platform into its upright retracted position by using a pair of shorter flexible lines attachable to the platform and the upper end of the yoke arms.

A safety feature of the apparatus includes a depression in the platform surface to receive the wheels of a forklift truck. When not in use this recess is preferably closed by a cover which hinges to an open position immediately rearward of the wheel seating recess thereby providing an additional safeguard against the wheels rolling from the recess.

Accordingly it is a primary object of the present invention to provide an improved heavy duty tailgate lifting apparatus for mounting on the rear end of a truck and utilizing a four-point support for the cargo platform effective to maintain the platform level while being raised and lowered.

Another object of the invention is the provision of a unique cargo lift apparatus attachable to the rear end of a truck and having a platform movably connected to a pivoting yoke operating in a vertical plane at the rear of the truck chassis.

Another object of the invention is the provision of a tailgate lift apparatus having its forward end pivoted to the arms of a yoke pivotally supported crosswise of a truck with the upper ends of its arms riding along the underside of cables having their forward ends fixed to the truck and their rear ends connected to the rear lateral sides of the platform and effective to maintain the platform level while being swung in an arc between ground and truck bed levels.

Another object of the invention is the provision of a tailgate lift apparatus having a remote control for the power operating means positioned directly on the lift.

Another object of the invention is the provision of a tailgate lift for attachment to the rear end of a truck and capable of supporting a conventional forklift truck thereon while being lifted between the ground and the truck bed.

Another object of the invention is the provision of a power operated tailgate lift apparatus including means utilizing the power unit to fold the load platform to its retracted position.

These and other more specific objects will appear upon reading the following specification and claims and upon considering in connection therewith the attached drawing to which they relate.

Referring now to the drawing in which a preferred embodiment of the invention is illustrated:

FIG. 3 is a view similar to FIG. 1, partly in section, showing the position of the parts with the load platform at ground level;

FIG. 4 is a view similar to FIG. 3 but showing the lift components during an intermediate stage of their adjustment for use with a high dock;

FIG. 6 is a side elevational view of a second preferred embodiment showing the load platform in its raised position flush with the truck bed.

Figure 1:
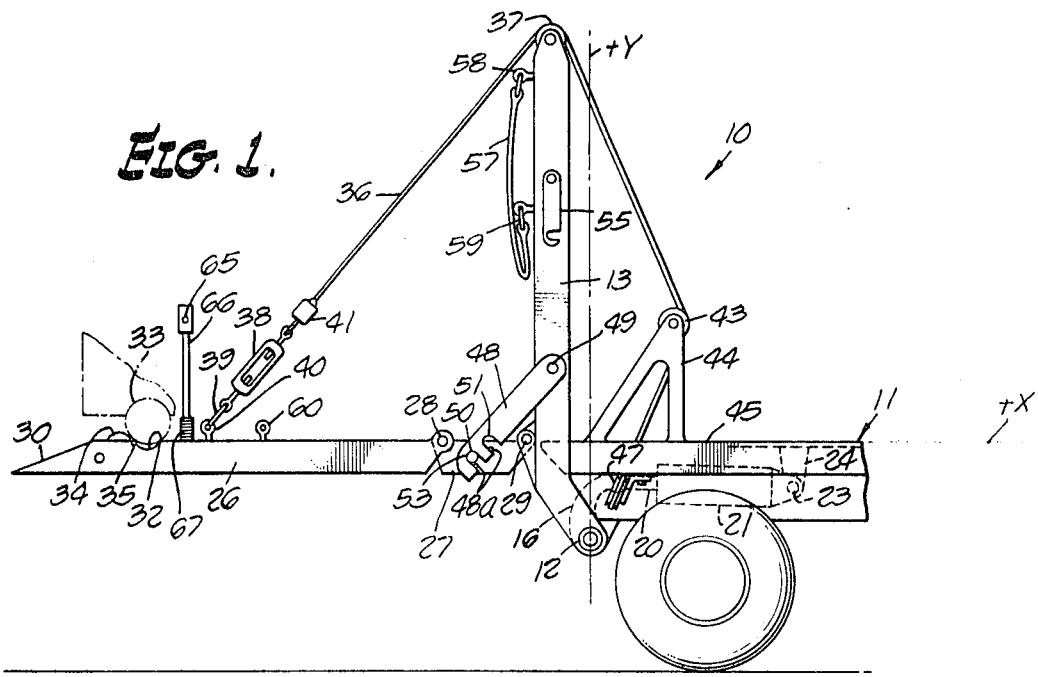
FIG. 1 is a side elevational view of one preferred embodiment of the invention showing the position of the parts when the lift is level with the truck bed.
Figure 2:
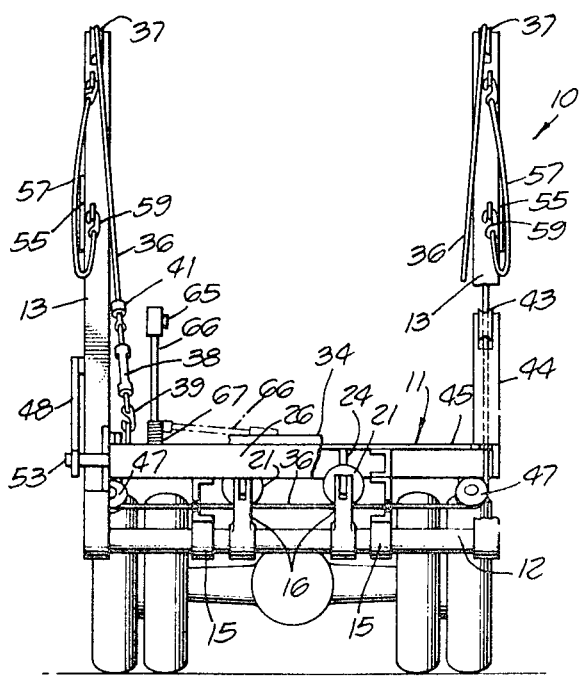
FIG. 2 is a rear end elevational view of FIG. 1.

Referring to FIGS. 1–5 there is shown a typical embodiment of the invention tailgate lift apparatus, designated generally 10, attached to the rear end of a conventional truck chassis 11. Apparatus 10 comprises a rigid yoke having a heavy duty horizontally disposed shaft 12 having rigidly fixed to its outer ends a pair of arms 13,13. Yoke shaft 12 is journalled to a pair of heavy duty brackets 15,15 (FIG. 2) welded or otherwise securely mounted on the chassis frame. Also fixed to shaft 12 are a pair of arms 16 (FIG. 2) having their outer ends pivoted to an associated piston rod 20 of a double acting hydraulic cylinder 21. The forward ends of the latter are pivotally connected at 23 to a bracket 24 fixed to the chassis frame. It will be understood that cylinders 21 include suitable hydraulic fluid lines connected to their opposite ends and to a source of pressurized fluid. The power cylinders are operable to pivot yoke 12,13 through an arc of somewhat less than 90° between the position shown in FIGS. 1 and 3.

The cargo platform comprises a major rigid section 26 and a relatively narrow minor section 27 pivotally connected together by hinge means 28. The forward edge of minor section 27 is pivotally connected to the yoke arms 13 by a hinge pin 29. The platform sections 26,27 are constructed from conventional structural components welded or brazed together and of sufficient strength to carry the design load. The rear transverse edge of section 26 is preferably beveled as indicated at 30 and its upper surface is preferably provided with a deep arcuate recess 32 sized to seat the wheels 33 of a forklift truck or other cargo carrying equipment if the latter is to be moved while supported on the platform. Recess 32 is preferably closed normally by a cover 34 hinged to the platform at 35 and shaped to fill the recess. When the recess is in use, cover 34 is pivoted rearwardly to its open position as shown in FIG. 1 wherein it underlies the rear of wheels 33 (FIG. 1) and provides a further safeguard against the wheels rolling rearwardly out of the recess.

An important feature of the invention is the provision of a pair of flexible cables, chains, or the like 36, having a midportion of each passing over a deeply grooved guide pulley 37 supported at the upper end of each yoke arm 13. The rear ends of lines 36 preferably include a suitable adjustable turnbuckle 38 and a hook 39 engageable in an eye 40 rigidly secured to the rear end portion of platform section 26. Forwardly of guide pulley 37 the tension lines 36 pass over grooved pulleys 43 supported in brackets 44 fixed to the opposite sides of the truck bed 45. If desired, the forward ends of the tension lines 36 may be rigidly fixed to brackets 44 although, as herein shown, the lines continue downwardly beside brackets 44 and about grooved pulleys 47 and transversely of the underside of the truck bed to a point of connection with one another in the manner made clear by FIG. 2. Inasmuch as the portions of lines 36 between pulleys 43 and extending crosswise of the underside of the truck bed do not move, this portion of the lines may be dispensed with and their forward ends may be terminated in fixed anchorages provided at the upper ends of brackets 44. However, it is pointed out that when the tension lines 36 are interconnected as shown it is unnecessary to provide a fixed anchorage for their forward ends adjacent the upper ends of brackets 44. Moreover, and as will be readily apparent, their interconnection and support on pulleys 43 and 47 enables the tension lines to equalize the load strains and to adjust as necessary for this purpose.

The provision of two platform sections 26,27 hinged together necessitates the use of some means for locking these sections against hinging while extended for use. Simple means serving this purpose comprises a pair of brace links 48 pivotally connected at 49 to yoke arms 13 and having a plurality of notches 50,51 positioned as shown and engageable over an associated headed pin 53 fixed to the side of platform section 27. Each of the notches preferably includes suitable means such as the well known spring pressed ball detent 48a effective to retain the notch engaged with pin 53 until intentionally and deliberately detached. Normally braces 48 are seated over pins 53 in the position shown in FIG. 1 so that the upper surfaces of the two platform sections lie in the same plane. However, a different adjusted position may be employed particularly where the rear end of the platform section 26 rests against a dock at a different level than the bed 45 of the truck.

The use and operation of the described cargo lifting apparatus will now be described. Initially, the platform is stored in the retracted position illustrated in FIG. 5 with the platform sections 26,27 folded against one another as shown, and locked in stored position by the latch 55. At this time the platform retraction cables 57 remain connected as shown with their upper ends supported in eyelets 58 and hooks 59 and their lower ends seated in eyelets 60 attached to platform section 26. This safeguards against the possibility of the platform unfolding rearwardly beyond a limited arc if latches 55 should become released accidentally.

The tension lines 36 hang vertically. A weight 41 on each tension line at the turnbuckle assures that the total weight of the tension line rearward of the yoke arms 13, including the weight of the hook and turnbuckle, is great enough to maintain these lines tensioned. In the stored position, a simple device, such as an eye retracted by a spring for engaging the hook near the lower part of the yoke arm, can be utilized to secure the tension line.

To extend the tailgate platform to its operating position, the operator releases the hooks 39 from their securing means so that the tension lines hang free. He then releases latches 55 and allows the platform section 26 to pivot rearward for a short distance. He then releases pressurized fluid from the rear ends of the power cylinders and simultaneously admits such fluid into the front ends of these cylinders so as to cause the yoke arms 13 and the platform to pivot rearward. As the platform section 26 approaches ground level, notch 50 on each of the bracing bars 48 automatically seats over pin 53 so as to rigidly lock platform section 27 against pivotal movement about hinge pin 29. When the platform is in a position near ground level, the operator engages hooks 39 into eyes 40. At very near ground level, the tension lines become taut and the retraction cables become slack, so that at ground level, the operator disconnects the lower ends of the retraction cables from eyelets 60. The operator also releases a wand 66, supported by a flexible spring 67, form the wand's storage position against the platform. This wand carries switches 65 for an electrically controlled valve for the pressurized fluid. After the operator checks to make certain that pins 53 are seated behind ball detents 48a, the apparatus is in readiness to transfer loads between the ground and the truck bed.

After cargo has been placed upon platform section 26, it is lifted to the truck bed by supplying pressurized fluid to the left-hand end of power cylinders 21 and releasing fluid from their other ends back to a fluid reservoir, forcing the piston forwardly and rotating yoke shaft 12 and the attached arms 13 upwardly to their upright positions. As this operation is occurring it will be evident that the forward ends of the tension lines 36 remain immovable as respects pulleys 43 whereas guide pulleys 37 at the upper ends of the yoke arms roll forwardly along the underside of tension lines 36, shortening the portion thereof between pulleys 37 and 43, while lengthening in exactly the same amount the portion of the lines rearward of pulleys 37. The lift can be stopped or supported firmly at any height, including a position flush with bed 45, by closing off both the supply and discharge of fluid from the opposite ends of cylinders 21 thereby locking these cylinders against movement in either direction.

Figure 5:
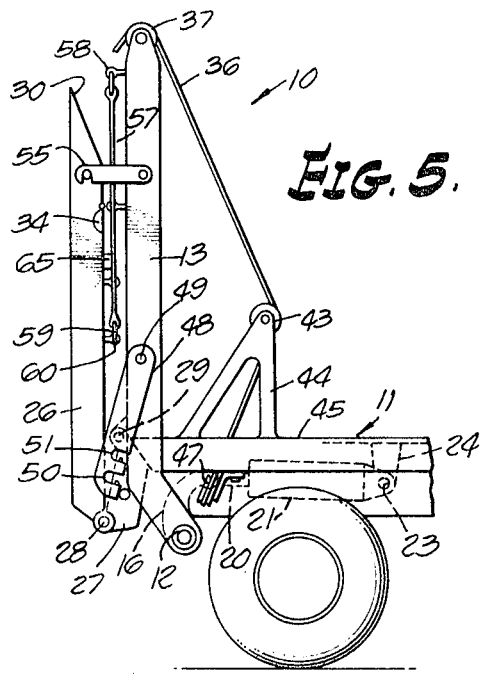
FIG. 5 is a side view of the apparatus stored in its fully retracted position.

After a period of use or when the operator desires to move the cargo lifting apparatus into its fully retracted position illustrated in FIG. 5, he lowers platform 26 to the position shown in FIG. 3 and attaches hooks 59 at the lower ends of retraction cables 57 to eyelets 60. He then raises platform 26 until the retraction cables are carrying the weight of the platform and tension lines 36 are slack. He now unhooks tension lines 36 from their eyes 40 and allows the tension lines to hang, there being enough weight in the ends of the tension lines to pull the lines over their pulleys 37 as cylinder 21 operates to elevate the yoke arms 13. At the position where the braces 48 had previously engaged pins 53, the braces are again under no stress, so that the operator now easily disengages the braces from their pins 53. The controls for the fluid to power cylinders 21 are then operated to pivot the yoke arms 13 toward their upright position causing the lifting cables 57 to lift platform 26. During this operation the two sections 26,27 of the platform fold together about hinge pins 28 for reasons self apparent from a consideration of FIGS. 3 and 5. Accordingly, as the arms 13 approach their upright position the platform sections 26,27 will appear as illustrated in FIG. 5 and lifting cables 57 will be substantially in a vertical taut condition or slightly relaxed as platform 26 is in a position to be locked closed by latch 55. These latches are then swung into latching position and the valves of the supply lines to either end of cylinders 21 are both closed locking the power piston against movement in either direction. The operator now engages hooks 39 on the tension lines with their storage securing means.

A second preferred embodiment of the invention is illustrated in FIG. 6, the same or similar components being designated by the same reference characters as in FIGS. 1–5, but distinguished therefrom by the addition of a prime. The principal difference resides in the omission of the minor platform section 27 and the connection of the forward edge of platform 26' to a bracket 70 carried by yoke arms 13'. Hinge pins 28' pivotally interconnecting platform 26' and bracket 70 is in substantially the same location as the corresponding hinge pins 28 in the first described embodiment. The presence of brackets 70 makes it unnecessary to provide both the detachable braces 48 and the minor section 27 of the load carrying platform; instead the bed 45' of the truck is extended so as to terminate adjacent hinge pin 28' in the elevated position of the lifting apparatus. Additionally, latches 55' are slightly longer for self-evident reasons.

It will be understood that lifting apparatus 10' operates substantially in the same manner described above in connection with FIGS. 1-5 with the exception that it is unnecessary to connect and disconnect the braces 48. It will also be recognized that owing to the absence of the pivoting platform section the main platform 26' extends to a somewhat higher elevation when folded in its retracted position corresponding to that shown in FIG. 5.

The mathematical relationships embodied in the operating principles of this invention whereby the platform 26 remains remarkably level while yoke 13 swings through a wide arc of 90° are not fully understood. The condition that the range of arc wherein the platform remains level is limited is evidence that the platform is strictly level at most in a number of isolated positions and essentially level between them. The platform remains level even though the arc is 90°. The drawings show an arc of 70° because this is the point of diminishing returns for this embodiment. A 15 percent greater arc provides only a 6 percent greater lift. But this invention is still applicable in other embodiments where the completely horizontal-to-vertical yoke is essential. In lieu of a mathematical explanation, the drawings accompanying this disclosure are drawn approximately to scale. In addition, in an operating model made according to the present drawing, the important dimensions and operation relationships were as listed below. The reference axes appear in FIG. 1, the X axis being along the bed 11 and coplanar with the raised platform 26, and the Y axis passing through the axes of shaft 12, and the dimensions being in inches, with the positive Y being upwards and the X axis being to the right in accordance with conventional practice:

|  | X | Y |
| --- | --- | --- |
| Shaft 12 | 0 | −18.5 |
| Pulley 37 | −6 | 73.5 |
| Pulley 43 | 19 | 24 |
| Hinge pin 29 | −9 | 0 |
| Hinge pin 28 | −26 | 0 |
| Eye 40 | −102 | 1.5 |

Pulleys 12 and 37 are 6 inches in diameter, and tension lines 36 comprise a 2 inch chain.

As will be readily appreciated, the invention cargo lifting apparatus can be constructed in a wide range of sizes using the above or closely related relative proportions of the characteristic dimensions typical of this invention. It will also be understood that the dimensions given above with respect to FIGS. 1 to 5 are equally applicable to FIG. 6.

While the particular tailgate cargo lifting apparatus for the rear end of a truck herein shown and disclosed in detail is fully capable of attaining the objects and providing the advantages hereinbefore stated, it is to be understood that it is merely illustrative of the presently preferred embodiment of the invention, and that no limitations are intended to the details of construction or design herein shown other than as defied in the appended claims.

I claim:

1. That improvement in a truck chassis which comprises a tailgate lifting apparatus for elevating cargo onto and off the rear end thereof, said apparatus comprising rigid yoke means having the arms thereof interconnected by shaft means extending crosswise of the rear end of said chassis and pivotally mounted thereon for arcuate movement in vertical planes along either side of said chassis, cargo supporting platform means pivotally connected to said yoke means near the lower ends of said arms, a flexible tension line along either side of said apparatus having the mid portion of each passing over pulley means supported near the outer ends of said yoke arms with their rear ends connected to the outer lateral edge portions of said platform means and their forward ends anchored to the truck chassis, and power means for rotating said yoke means about the pivot axis thereof to raise and lower said cargo support means independently of the truck bed while maintaining said support means in a horizontal plane.

2. That improvement defined in claim 1 characterized in that said power means is connected to said shaft means and operable to rotate the latter in either direction.

3. That improvement defined in claim 2 characterized in that said power means comprises reversible hydraulically driven motor means.

4. That improvement defined in claim 1 characterized in that the forward ends of said tension lines are provided with fixed support means located forwardly of said yoke arms and at a level intermediate the opposite ends of said arms when pivoted to an upright position.

5. That improvement defined in claim 1 characterized in the provision of means pivotally connecting the forward end of said cargo support means to said yoke means along a horizontal pivot axis spaced rearwardly from the axis of the yoke shaft means.

6. That improvement defined in claim 5 characterized in that said means pivoted to the forward end of said cargo support means is fixed to said yoke means.

7. That improvement defined in claim 6 characterized in that the pivot connection between said yoke means and the forward end of said cargo support means is located substantially adjacent the rear end of the bed of said truck chassis when said cargo support means is in the elevated position thereof and positioned for the transfer of cargo to and from the truck bed.

8. That improvement defined in claim 5 characterized in that said cargo support means includes a main section and a relatively narrow section hinged along the opposite longer edges thereof respectively to said yoke arms and to the forward transverse edge of said main section, and means for releasibly locking said relatively narrow section against hinging movement relative to said yoke arms when said apparatus is in use to elevate cargo.

9. That improvement defined in claim 8 characterized in that said narrow section of said cargo support means is adapted to fold downwardly toward the upper surface of said main section as the latter is swung upwardly to an upright retracted position across the rear end of said truck chassis.

10. That improvement defined in claim 1 characterized in the provision of relatively short flexible line means for connecting the upper end of at least one of said yoke arms to said cargo support means when the latter is supported in at least a partially lowered position and usable to pivot said support means toward the upright retracted position thereof as said yoke means is moved to its upright position.

11. That improvement defined in claim 1 characterized in the provision in the upper surface of said cargo support means of wheel seating depression means adapted to seat the wheel of a cargo laden transport device while being elevated by said apparatus.

12. That improvement defined in claim 11 characterized in the provision of cover means for said depression means and hinged to the rear thereof for pivotal movement between a closed position flush with the top of said depression means and an open position directly rearward of said depression means.

13. That improvement defined in claim 1 characterized in the provision of manual control means for said power means located on and movable with said cargo support means and enabling an operator to control said power means while on said support means.

14. A tailgate type cargo lifting apparatus for attachment across the rear end of a truck chassis and operable to raise and lower cargo to and from a stationary truck bed fixed to said chassis, said apparatus comprising means for securing a rotary shaft crosswise of the rear end of the chassis and having an arm rigidly connected normal to either end thereof, platform means having the forward edge pivoted between said arms, flexible cable means for maintaining said platform means horizontal while being elevated between ground level and the level of the truck bed and including a cable along either lateral side of said platform means with the rear end connected to a rear portion of said platform means, the mid portion thereof passing over an associated pulley carried on the upper end portions of said arms and the forward end anchored to the truck forwardly of said arms at a point such that the pivotal movement of said arms through approximately one quadrant is effective to move said platform means between truck bed level and ground level while maintaining the same level, and power means for pivoting said shaft means to raise and lower said platform means.

15. Cargo lifting apparatus as defined in claim 14 characterized in that said platform means comprises a unitary load support member hinged to said arms adjacent the rearward edge of said truck bed when said platform means is raised to a level flush with said truck bed.

16. Cargo lifting apparatus as defined in claim 14 characterized in that said platform means comprises a major and a minor section hinged together parallel to said shaft means, hinge means connecting the forward edge of said minor section to said arms intermediate the opposite ends thereof, and said major and minor sections being foldable against one another when said major section is folded upwardly to an upright retracted position.

17. Cargo lifting apparatus as defined in claim 14 characterized in the provision of flexible tension means attachable to said platform means while the latter is in a lowered position and to a point near the upper ends of said arms and effective as said power means is operated to pivot said arms to an upright position to fold said platform means toward an upright retracted position beside said arms, and means for locking said platform means in a retracted non-operating position.

18. Cargo lifting apparatus as defined in claim 16 characterized in the provision of flexible tension lines having their upper ends connected to the outer end portions of said arms and their lower ends detachably connectable to said major platform section at a point effective to fold said major and minor platform sections against one another in a generally upright position against said arms as said power means pivots said arms toward the upright retracted position thereof.

19. Cargo lifting apparatus as defined in claim 18 characterized in the provision of means for releasably locking said platform means retracted closely beside said upright arms.

20. Cargo lifting apparatus as defined in claim 18 characterized in that said folded and retracted platform sections are positioned against the rear end of said truck bed and provide an upright tailgate for the truck bed.

* * * * *